United States Patent Office 3,207,776
Patented Sept. 21, 1965

3,207,776
HALO-SUBSTITUTED VINYL PHOSPHATE PESTICIDES
Everett E. Gilbert, Morris Township, Morris County, Julian A. Otto, Lake Tamarack, and John J. Donleavy, North Caldwell, N.J., assignors to Allied Chemical Corporation, a corporation of New York
No Drawing. Filed Nov. 22, 1957, Ser. No. 698,046
4 Claims. (Cl. 260—461)

This invention relates to the production of new halo-substituted vinyl phosphates useful as active insecticidal and miticidal toxicants.

These new halo-substituted vinyl phosphates conform to the general formula:

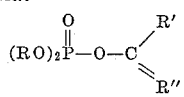

in which R is an alkyl radical, particularly an alkyl radical containing from 1 to 4 carbon atoms, R' is a member of the group consisting of hydrogen, and alkyl, chloro-substituted alkyl, fluoro-substituted alkyl and chlorofluoro-substituted alkyl radicals, particularly chloromethyl, fluoromethyl or chlorofluoromethyl, and R'' is a member of the group consisting of chloro-substituted alkylene, fluoro-substituted alkylene and chlorofluoro-substituted alkylene radicals, particularly chloromethylene, fluoromethylene or chlorofluoromethylene, R' and R'' taken together containing at least one fluorine atom.

In the new compounds, typical examples of R are $CH_3$, $C_2H_5$ and $(CH_3)_2CH$. Typical examples of R' are H, $CH_3, CCl_3$, $CCl_2F$, $CClF_2$, $CF_3$ and $CHF_2$. Typical examples of R'' are $CCl_2$, $CF_2$, $CClF$ and $CHF$.

Halo-substituted vinyl phosphates of the general formula given above may be prepared according to certain aspects of the invention by reacting a fluoro- or chlorofluoro-substituted aldehyde or ketone with a dialkyl phosphite to form an intermediate phosphonic ester. When the intermediate phosphonic ester is prepared from a chlorofluoro-substituted aldehyde or ketone, the intermediate phosphonic ester may be distilled under reduced pressure to convert the ester into the corresponding chlorofluoro-substituted vinyl phosphate. Alternatively, in place of conversion by distillation procedure, the intermediate phosphonic ester may be treated with an inorganic or organic base such as sodium hydroxide or pyridine, whereby it is converted into the desired chloro-fluoro-substituted vinyl phosphate. In the case of an intermediate phosphonic ester prepared from a fluoro-substituted aldehyde or ketone containing no chlorine atom, the intermediate phosphonic ester must be subjected to the treatment with a base in order to convert it into the corresponding fluoro-substituted vinyl phosphate.

The reaction between the chlorofluoro- or fluoro-substituted aldehydes or ketones and dialkyl phosphites to form the desired vinyl phosphates of the present invention may be represented by the following equations. In the equations R, R' and R'' have the meanings shown above, R''' is a member of the group consisting of chloro-substituted alkyl, fluoro-substituted alkyl and chlorofluoro-substituted alkyl radicals, and R' and R''' taken together contain at least one fluorine atom.

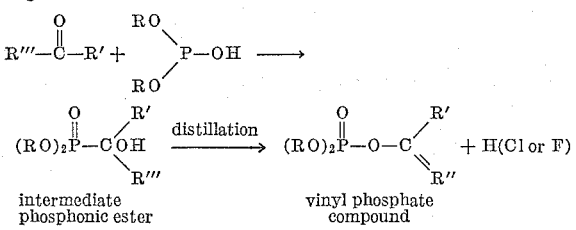

In this reaction, by-product HCl is obtained from chlorofluoro-substituted aldehydes or ketones, while by-product HF is obtained from fluoro-substituted aldehydes and ketones containing no chlorine atoms.

According to other aspects of the present invention, chlorofluoro-substituted vinyl phosphates may be prepared by reacting a chlorofluoro-substituted aldehyde or ketone with a trialkyl phosphite. In this reaction, the intermediate phosphonic ester is transitory and breaks down, without further treatment, into the desired chlorofluoro-substituted vinyl phosphate. These reactions may be represented by the following equations. In the equations R, R' and R'' have the meanings shown above, R''' is a member of the group consisting of chloro-substituted alkyl, fluoro-substituted alkyl and chlorofluoro-substituted alkyl radicals, and R' and R''' taken together contain at least one chlorine atom and at least one fluorine atom.

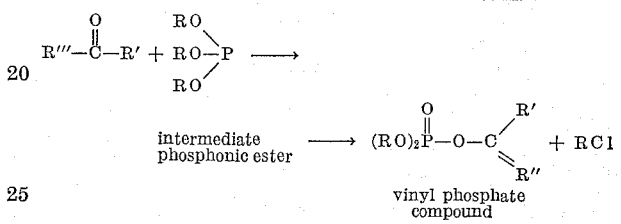

Although the substiuted aldehydes or ketones and alkyl phosphites may be charged in molar proportions of one mol of substituted aldehyde or ketone to about 0.5 to 1.5 mols of dialkyl or trialkyl phosphite, approximately equimolar proportions of the reactants are preferred.

If desired, the present reactions may be carried out in the presence of an inert organic solvent, preferably one lower boiling than the vinyl phosphate produced. Suitable inert organic solvents include methylene chloride, ethyl ether, acetone and benzene. When the reactions are completed, lower boiling solvent so used may be recovered for reuse by simple distillation at atmospheric or lower pressure.

The reactions may be carried out at any temperature up to the decomposition point of the reactants, and are preferably carried out at about 10° to 100° C. Generally, the reaction is quite vigorous during the addition of the reactants, and cooling is desirable to retard the reaction. As is apparent from the above equations illustrating the reaction of the substituted aldehydes or ketones with alkyl phosphites, hydrogen chloride or fluoride (in the case of the dialkyl phosphite reactants) or alkyl chloride (in the case of the trialkyl phosphite reactants) are formed. These by-products may be readily removed from the reaction mixtures by simple distillation procedures. The hydrogen chloride or fluoride may be conveniently collected in a water trap connected to the vessel in which reaction takes place.

The following examples are given for the purpose of illustrating the present invention but are not intended to be limiting on the scope thereof. Parts are by weight.

*Example 1.*—108 parts of trichlorotrifluoroacetone were placed in a reaction vessel provided with a stirrer and an ice bath. 69 parts of diethyl phosphite were added dropwise over a 20-minute period with stirring and cooling to maintain the temperature of the reaction mixture at 20° C. (±5° C.). Stirring of the reaction mixture was continued for 2 hours at room temperature, and it was allowed to stand overnight. The reaction mixture was then vacuum distilled. A liquid comprising the chlorofluoro-substituted vinyl phosphate, having the following formula, distilled over at 84° to 86° C. (1.5 mm. mercury pressure):

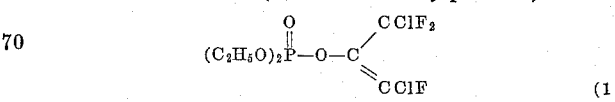

(1

The vinyl phosphate product constituted 102 parts (64% of theory).

*Example 2.*—116 parts of tetrachlorodifluoroacetone were placed in a reaction vessel provided with a stirrer and an ice bath. 83 parts of triethyl phosphite were added dropwise over a 40-minute period with stirring and cooling to maintain the reaction mixture at a temperature of 20° C. (±5° C.). The reaction mixture was stirred for 2 hours at room temperature and was allowed to stand overnight. The reaction mixture was then slowly warmed under reduced pressure to remove ethyl chloride formed during the reaction. Finally, the reaction mixture was vacuum distilled. A liquid comprising the chlorofluoro-substituted vinyl phosphate having the following formula distilled over at 111° to 112° C. (2.5 mm. mercury pressure):

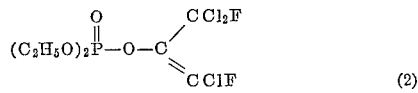 (2)

The vinyl phosphate product constituted 161.5 parts (97% of theory).

*Example 3.*—124.3 parts of pentachloromonofluoroacetone were placed in a reaction vessel provided with a stirrer and an ice bath. 62 parts of triethyl phosphite were added dropwise over a 35-minute period with stirring and cooling to maintain the temperature at 20° C. (±5° C.). The reaction mixture was then allowed to stand at room temperature for 40 hours. Ethyl chloride formed during the reaction was stripped off under reduced pressure. The reaction mixture was then vacuum distilled. A water-white liquid comprising the chlorofluoro-substituted vinyl phosphate having the following formula distilled over at 128° to 130° C. (1.5 mm. mercury pressure):

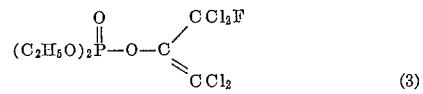 (3)

147 parts of the vinyl phosphate product were obtained, the yield being 91.3% of theory.

*Example 4.*—100 parts of pentachloromonofluoroacetone were put in a reaction vessel provided with a stirrer and an ice bath. 50 parts of trimethyl phosphite were added dropwise over a period of 45 minutes with stirring and cooling to maintain the temperature of the reaction mixture at 20° C. (±5° C.). The reaction mixture was allowed to stand at room temperature for several days and, after stripping off by-product methyl chloride under reduced pressure, was vacuum distilled. 117.5 parts of a water-white liquid comprising the chlorofluoro-substituted vinyl phosphate having the following formula distilled over at 113° to 115° C. (1.5 mm. mercury pressure):

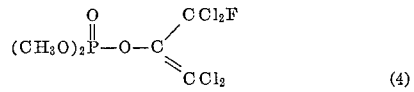 (4)

The yield of vinyl phosphate product obtained was 91% of theory.

*Example 5.*—139 parts of tetrachlorodifluoroacetone were placed in a reaction vessel provided with a stirrer and an ice bath. 66 parts of dimethyl phosphite were added dropwise with stirring and cooling to maintain the reaction mixture at 10° C. (±2° C.). The reaction mixture was allowed to stand at room temperature for a few days. The reaction mixture was then vacuum distilled. The distillate coming over at about 97° C. (2.2 mm. mercury pressure) was a liquid comprising the chlorofluoro-substituted vinyl phosphate having the following formula:

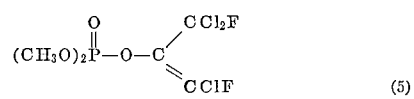 (5)

54 parts of the vinyl phosphate product were collected, constituting a yield of 29% of theory.

*Example 6.*—116 parts of tetrachlorodifluoroacetone were placed in a reaction vessel provided with a stirrer and an ice bath. 62 parts of trimethyl phosphite were added dropwise over a 1 hour period with stirring and cooling to maintain the temperature of the reaction mixture at 20° C. (±5° C.). The reaction mixture was allowed to stand at room temperature for several days. After stripping off by-product methyl chloride under reduced pressure, the reaction mixture was vacuum distilled. 147 parts of a water-white liquid comprising the following chlorofluoro-substituted vinyl phosphate distilled over at 90° to 92° C. (1.5 mm. mercury pressure):

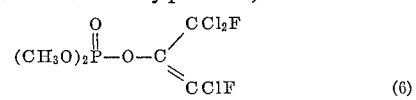 (6)

The vinyl phosphate product yield constituted 96% of theory.

*Example 7.*—129 parts of trichlorotrifluoroacetone were placed in a reaction vessel provided with a stirrer and an ice bath. 66 parts of dimethyl phosphite were added dropwise over a 20-minute period with stirring and cooling to maintain the temperature of the reaction mixture at 10° C. (±2° C.). After addition of the dimethyl phosphite, stirring was continued for 35 minutes with the cooling bath removed. The mixture was allowed to stand overnight and was then vacuum distilled. 96 parts of a liquid comprising the following chlorofluoro-substituted vinyl phosphate distilled over at 83° to 85° C. (2.5 to 3 mm. mercury pressure):

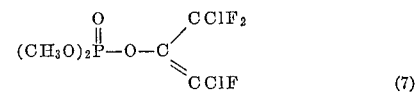 (7)

The amount of vinyl phosphate product collected represented 55% of theory.

*Example 8.*—108 parts of trichlorotrifluoroacetone were placed in a reaction vessel provided with a stirrer and an ice bath. 83 parts of triethyl phosphite were added dropwise over a 40-minute period with stirring and cooling to maintain the temperature of the reaction mixture at 20° C. (±5° C.). The reaction mixture was stirred for 2 hours at room temperature and allowed to stand overnight. Ethyl chloride by-product was stripped off at reduced pressure, and the reaction mixture was then vacuum distilled. 94 parts of a liquid comprising the following chlorofluoro-substituted vinyl phosphate distilled over at 82° to 84° C. (1.4 mm. mercury pressure):

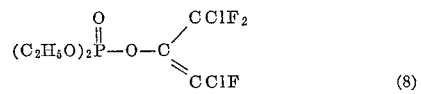 (8)

The amount of vinyl phosphate product collected constituted 87% of theory.

*Example 9.*—120 parts of dichlorotetrafluoroacetone were placed in a reaction vessel provided with a stirrer and an ice bath. 66 parts of dimethyl phosphite were added dropwise with stirring and cooling to maintain the temperature at 10° C. (±2° C.). The reaction mixture was allowed to stand for a few days and then was vacuum distilled. 67 parts of a light yellow oil comprising the following chlorofluoro-substituted vinyl phosphate were collected at 70° to 72° C. (4.2 mm. mercury pressure):

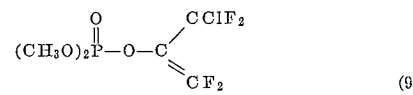 (9)

The amount of vinyl phosphate product collected comprised 41% of theory.

*Example 10.*—99.5 parts of dichlorotetrafluoroacetone were placed in a reaction vessel provided with a stirrer and an ice bath. 69 parts of diethyl phosphite were added dropwise over a 20-minute period with stirring and cooling to maintain the temperature of the reaction mixture at 20° C. (±5° C.). The reaction mixture was stirred for 2 hours at room temperature and allowed to stand overnight. The reaction mixture was then vacuum distilled. 111 parts of a liquid comprising the following chlorofluoro-substituted vinyl phosphate compound distilled over at a temperature of 80° to 81° C. (3.5 mm. mercury pressure):

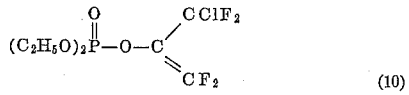 (10)

The amount of vinyl phosphate product recovered represented 74% of theory.

*Example 11.*—99.5 parts of dichlorotetrafluoroacetone were placed in a reaction vessel provided with a stirrer and an ice bath. 83 parts of triethyl phosphite were added dropwise over a 20-minute period with stirring and cooling to maintain the temperature of the reaction mixture at 20° C. (±5° C.). The reaction mixture was stirred for 2 hours at room temperature and allowed to stand overnight. By-product ethyl chloride was stripped off at reduced pressure, and the reaction mixture was then vacuum distilled. 145 parts of a liquid comprising the following chlorofluoro-substituted vinyl phosphate compound distilled over at a temperature of 75° to 76° C. (3 mm. mercury pressure):

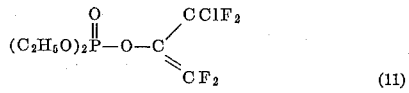 (11)

The amount of vinyl phosphate product recovered represented 96% of theory.

*Example 12.*—A solution of 55 parts of dimethyl phosphite in 100 parts of methylene chloride were placed in a reaction vessel provided with a gassing tube, a stirrer and an ice bath. 91.5 parts of chloropentafluoroacetone in nitrogen as carrier were bubbled into the solution over a 1½-hour period, maintaining the temperature of the solution at about 10° C. (±5° C.). The ketone had been liquefied at Dry-Ice temperature and was allowed to boil off into a slow stream of nitrogen. The reaction mixture was stirred for 1½ hours, allowing it to come to room temperature, and was then allowed to stand overnight. The methylene chloride solvent was stripped off on a steam bath at reduced pressure, and the residue was then vacuum distilled. 80.5 parts of a liquid comprising the following fluoro-substituted vinyl phosphate compound distilled over at 41° to 45° C. (1.5 to 2.5 mm. mercury pressure):

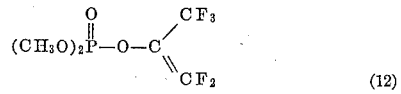 (12)

The amount of vinyl phosphate product recovered constituted 63% of theory.

*Example 13.*—110 parts of dimethyl phosphite in 310 parts of methylene chloride were charged into a reaction vessel equipped with a gassing tube, a stirrer, a reflux condenser and a drying tower at the exit of the condenser. 114.5 parts of chlorodifluoroacetaldehyde were introduced through the gassing tube mixed with nitrogen as it was generated in another reaction vessel. (The chlorodifluoroacetaldehyde was obtained by dropping chlorodifluoroacetaldehyde hydrate in concentrated sulfuric acid (96%) warmed to about 50° C., and then distilling off the aldehyde.) During addition of the aldehyde, the reaction vessel was maintained at a temperature of 25° to 35° C. The reaction mixture was stripped free of methylene chloride at reduced pressure and was then vacuum distilled (3 mm. mercury pressure). 188 parts of residue were obtained.

94 parts of the residue were added to about 1200 parts of water with stirring. 20 parts of sodium hydroxide in about 100 parts of water were then slowly added with continued stirring. The aqueous mixture was extracted four times with a total of about 500 parts of ether. After drying the extract over anhydrous sodium sulfate, ether was evaporated. The residue was then subjected to vacuum distillation. A liquid comprising the fluoro-substituted vinyl phosphate having the following formula distilled over at 58° C. (3 mm. mercury pressure):

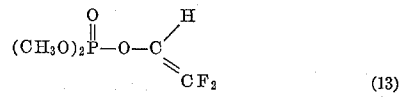 (13)

*Example 14.*—39 parts of tetrafluoroacetone were placed in a reaction vessel provided with a stirrer. 33 parts of dimethyl phosphite were added dropwise over a period of 10 minutes with stirring, while maintaining the temperature of the reaction mixture at 30° C. (±5° C.). The reaction was continued for about 20 minutes, holding the temperature at 40° to 45° C. The reaction mixture was allowed to stand at room temperature for a few days and was then heated to 80° C. at 2.5 mm. mercury pressure. The residue comprised 69 parts of the following intermediate phosphonic ester:

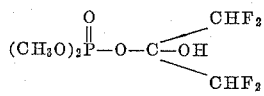

24 parts of the phosphonic ester were dissolved in about 50 parts of water, and 100 parts of 1.0 N sodium hydroxide were then slowly added. After addition of the sodium hydroxide, an oil separated which was extracted with 100 parts of methylene chloride. The methylene chloride extract was dried over anhydrous sodium sulfate, and methylene chloride was then stripped off at reduced pressure. The residue constituted 13 parts of an almost water-white liquid comprising the following fluoro-substituted vinyl phosphate:

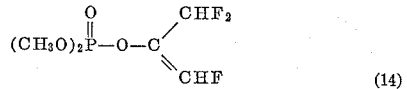 (14)

*Example 15.*—55 parts of dimethyl phosphite were charged into a reaction vessel provided with a gassing tube, a stirrer and a Dry Ice-cooled condenser. 66 parts of trifluoroacetone gas were fed into the vessel through the gassing tube. The temperature of the reaction mixture rose to 34° C. and was held relatively constant by the trifluoroacetone reflux, the rate of which increased as more trifluoroacetone was added. The reaction mixture was then heated at reflux for 5 hours, the temperature being maintained at about 34° C. The reaction mixture was allowed to stand overnight and was then heated at reduced pressure. First, unreacted trifluoroacetone (36 parts) was stripped off. Then, the reaction mixture was vacuum distilled at 2.5 mm. mercury pressure. 38 parts distilled over at 38° to 51° C., and the residue comprised 32.5 parts of the following intermediate phosphonic ester:

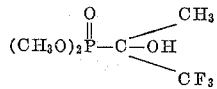

The unreacted trifluoroacetone and the distillate from the vacuum distillation were combined, returned to the reaction vessel and again heated at reflux. Starting at 37° C., the temperature slowly rose after 10 hours to 60° C., and after 11 hours to 75° C. The reaction mixture was then held at a temperature of 75° C. (±5° C.) for 6 hours and was distilled as above. The residue comprised 58 parts of the above intermediate phosphonic ester and was combined therewith.

To 44.4 parts of the phosphonic ester were added about 200 parts of 1.0 N sodium hydroxide. The phosphonic ester slowly dissolved, and an oil gradually separated. After one day, 15 parts of the oil had separated. This oil comprised the following fluoro-substituted vinyl phosphate:

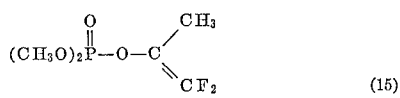 (15)

As indicated above, the vinyl phosphate compounds of this invention find valuable application as active insecticidal and miticidal toxicants. These compounds are ordinarily applied as toxicants for combating insect and mite pests, in conjunction with a carrier which may be a solid, liquid or gaseous material. The vinyl phosphate compounds may be employed either in the form of aqueous sprays or dust compositions and the amount of toxicant used may vary, a sufficient quantity being utilized to provide the required toxicity.

When employed in the form of a powder or dust for killing insects and mites, the above compounds or toxicants may be mixed with a substantial proportion of any suitable inert material or diluent, preferably in finely divided form, such as known grades of prepared paraciticide carrier clays, pyrophyllite, fuller's earth, bentonite, sulfur, lime, talc, whiting, diatomaceous earth, etc. Suitable dusts of this type usually contain not less than 0.25% and preferably not less than 0.5% by weight of toxicant.

Liquid insecticide or miticide sprays containing the toxicant of the invention may be prepared by first forming a solution of the compound in a suitable organic solvent, e.g., xylene, methylated naphthalenes or any highly aromatic petroleum-type insecticidal oil, and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or emulsions may be formed by incorporating in water dry mixtures or so-called wettable spray powders containing the phosphate products of the invention. These mixtures may also include inert diluents, suitable quantities of wetting or emulsifying agents, and if desired, secondary toxicants.

The aqueous spray dispersions of the invention preferably should contain the active ingredient in an amount not less than 1/16 of a pound per 100 gallons of spray, the more usual concentrations being in the range of 1/16 to 1/4 of a pound per 100 gallons of spray.

Insecticidal and miticidal properties of vinyl phosphate compounds typical of those embraced within the scope of this invention are indicated in the following table:

| Halo-Substituted Vinyl Phosphate | Formulation | Housefly Kill, Percent [1] | Mite Kill, Percent [2] |
|---|---|---|---|
| Compound (1) | 0.4% vinyl phosphate composition,[3] 20% Karo syrup (a commercial corn syrup), 79.6% water. | 100 | |
| Compound (2) | 0.25% vinyl phosphate composition,[3] 20% Karo syrup, 79.75% water. | 81.5 | |
| Compound (3) | 0.25% vinyl phosphate composition,[3] 20% Karo syrup, 79.75% water. | 94.4 | |
| Compound (4) | 0.25% vinyl phosphate composition,[3] 20% Karo syrup, 79.75% water. | 100 | |
| Compound (5) | 0.0125% vinyl phosphate compound, 2.5% Karo syrup, 97.48% water. | 96.1 | |
| Compound (5) | 1/4 pt. vinyl phosphate compound [4] per 100 gals. water. | | 97.8 (2 days). |
| Compound (6) | 0.25% vinyl phosphate composition,[3] 20% Karo syrup, 79.75% water. | 100 | |
| Compound (7) | 0.1% vinyl phosphate compound, 10% Karo syrup, 89.9% water. | 100 | |
| Compound (7) | 1 pt. vinyl phosphate composition,[3] per 100 gals. water. | | 96.6 (3 days). |
| Compound (8) | 0.4% vinyl phosphate composition,[3] 20% Karo syrup, 79.6% water. | 100 | |
| Compound (9) | 0.1% vinyl phosphate compound, 10% Karo syrup, 89.9% water. | 100 | |
| Compound (10) | 0.4% vinyl phosphate composition,[3] 20% Karo Syrup, 79.6% water. | 100 | |
| Compound (11) | 0.4% vinyl phosphate composition,[3] 20% Karo syrup, 79.6% water. | 100 | |
| Compound (13) | 1 pt. vinyl phosphate composition [3] per 100 gals. water. | | 98.7 (3 days). |
| Compound (14) | 1 part by volume of a solution of vinyl phosphate compound in acetone [5] per 319 parts by volume of water. | | 98.9 (3 days). |

[1] The tests on toxicity to houseflies (*Musca domestica*) were run by spraying the indicated formulation onto glass plates and allowing them to dry. The flies were confined over the plates, and percent kill was recorded 24 hours after confinement.
[2] The tests on toxicity to mites (*Tetranychus bimaculatus*) were run by spraying horticultural (cranberry) bean plants infested with mites with the indicated formulation. Following treatment, the plants were stored on racks in irrigated trays under greenhouse conditions. Observations were made 2 or 3 days following spraying.
[3] Vinyl phosphate compositions in the form of 25% emulsible concentrates comprising 25% by weight vinyl phosphate compound (toxicant), 5% by weight Triton X-155 (a commercial emulsifying agent comprising an alkyl aryl polyether alcohol) and 70% by weight cyclohexanone.
[4] Emulsified with 0.1% by weight of Triton X-155, a commercial alkyl aryl polyether alcohol.
[5] 4.8 grams of vinyl phosphate compound dissolved in acetone to 100 cc.

While we have described the preferred embodiments for carrying out our invention, it will be apparent that many changes may be made without departing from the spirit of the invention.

We claim:

1. A halo-substituted vinyl phosphate having the following general formula:

$$(RO)_2\overset{O}{\overset{\|}{P}}-O-C\overset{R'}{\underset{R''}{\diagdown}}$$

in which R is alkyl containing from 1 to 4 carbon atoms, R' is chlorofluoro-substituted methyl and R" is a member of the group consisting of chloro-substituted methylene and chlorofluoro-substituted methylene.

2. A chlorofluoro-substituted vinyl phosphate having the following general formula:

$$(RO)_2\overset{O}{\overset{\|}{P}}-O-C\overset{R'}{\underset{R}{\diagdown}}$$

in which R is alkyl containing from 1 to 4 carbon atoms, R' is chlorofluoromethyl and R" is chlorofluoromethylene.

3. The chlorofluoro-substituted vinyl phosphate having the following formula:

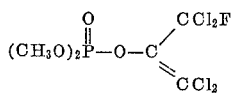

4. The chlorofluoro-substituted vinyl phosphate having the following formula:

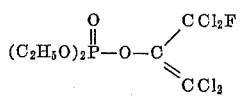

References Cited by the Examiner

UNITED STATES PATENTS

| | | | |
|---|---|---|---|
| 2,582,204 | 1/52 | Kosolapoff | 167—22 |
| 2,631,162 | 3/53 | Ladd | 260—461 |
| 2,650,935 | 9/53 | Gamrath | 260—461 |
| 2,678,329 | 5/54 | Gamrath | 260—461 |
| 2,698,820 | 1/55 | Newcomer | 167—22 |
| 2,956,073 | 10/60 | Whetstone et al. | 260—461 |
| 2,968,591 | 1/61 | Tracy | 260—461 |
| 3,149,142 | 10/64 | Drysdale et al. | 260—461 |

FOREIGN PATENTS 1,066,923    1/54    France.

OTHER REFERENCES

Allen: "J. Am. Chem. Soc.," 77, 2871 (May 20, 1955).

CHARLES B. PARKER, *Primary Examiner.*

ABRAHAM H. WINKELSTEIN, MORRIS LIEBMAN, IRVING MARCUS, *Examiners.*

UNITED STATES PATENT OFFICE
CERTIFICATE OF CORRECTION

Patent No. 3,207,776                          September 21, 1965

Everett E. Gilbert et al.

It is hereby certified that error appears in the above numbered patent requiring correction and that the said Letters Patent should read as corrected below.

Column 8, lines 70 to 73, the formula should appear as shown below instead of as in the patent:

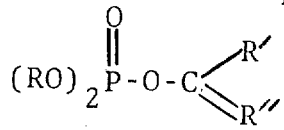

Signed and sealed this 5th day of April 1966.

(SEAL)
Attest:

ERNEST W. SWIDER                              EDWARD J. BRENNER
Attesting Officer                                  Commissioner of Patents